(12) United States Patent
Guen et al.

(10) Patent No.: US 9,812,695 B2
(45) Date of Patent: Nov. 7, 2017

(54) SECONDARY BATTERY

(71) Applicant: SAMSUNG SDI CO., LTD., Yongin-si, Gyeonggi-do (KR)

(72) Inventors: Minhyung Guen, Yongin-si (KR); Yongchul Seo, Yongin-si (KR)

(73) Assignee: Samsung SDI Co., Ltd., Yongin-si, Gyeonggi-do (KR)

(*) Notice: Subject to any disclaimer, the term of this patent is extended or adjusted under 35 U.S.C. 154(b) by 404 days.

(21) Appl. No.: 14/295,391

(22) Filed: Jun. 4, 2014

(65) Prior Publication Data

US 2015/0207118 A1 Jul. 23, 2015

(30) Foreign Application Priority Data

Jan. 21, 2014 (KR) .................. 10-2014-0007340

(51) Int. Cl.
| | |
|---|---|
| *H01M 2/34* | (2006.01) |
| *H01M 2/30* | (2006.01) |
| *H01M 2/04* | (2006.01) |
| *H01M 2/08* | (2006.01) |
| *H01M 2/12* | (2006.01) |
| *H01M 2/22* | (2006.01) |
| *H01M 2/26* | (2006.01) |
| *H01M 2/20* | (2006.01) |

(52) U.S. Cl.
CPC ............ *H01M 2/345* (2013.01); *H01M 2/04* (2013.01); *H01M 2/1223* (2013.01); *H01M 2/1229* (2013.01); *H01M 2/20* (2013.01); *H01M 2/22* (2013.01); *H01M 2/26* (2013.01); *H01M 2/30* (2013.01); *H01M 2/08* (2013.01); *H01M 2200/20* (2013.01)

(58) Field of Classification Search
CPC .... H01M 2/1223; H01M 2/1229; H01M 2/20; H01M 2/22; H01M 2/26; H01M 2/30; H01M 2/345; H01M 2/04; H01M 2/08; H01M 2200/20
See application file for complete search history.

(56) References Cited

U.S. PATENT DOCUMENTS

| | | | |
|---|---|---|---|
| 2011/0104562 A1* | 5/2011 | Byun ................ | H01M 2/06 429/181 |
| 2011/0183198 A1 | 7/2011 | Byun et al. | |
| 2012/0183818 A1 | 7/2012 | Byun et al. | |
| 2012/0214030 A1* | 8/2012 | Guen ................ | H01M 2/0404 429/61 |

(Continued)

FOREIGN PATENT DOCUMENTS

| | | | |
|---|---|---|---|
| JP | WO 2011145595 A1 * | 11/2011 | .......... H01M 2/0413 |
| KR | 10-2011-0087566 A | 8/2011 | |
| KR | 10-2012-0089983 A | 8/2012 | |

*Primary Examiner* — Eugenia Wang
(74) *Attorney, Agent, or Firm* — Lee & Morse, P.C.

(57) ABSTRACT

The secondary battery includes an electrode assembly, a case accommodating the electrode assembly, a cap plate sealing the case and including an inversion plate, and a terminal assembly. The terminal assembly includes an insulation plate coupled to a top surface of the cap plate and having a short-circuit hole corresponding to the inversion plate and an air hole spaced apart from the short-circuit hole, a terminal plate coupled to a top surface of the insulation plate and electrically connected to the electrode assembly, and a sealing member coupled to a bottom surface of the insulation plate and opening or closing the air hole.

8 Claims, 7 Drawing Sheets

(56) References Cited

U.S. PATENT DOCUMENTS

| | | | |
|---|---|---|---|
| 2012/0237802 A1* | 9/2012 | Byun | H01M 2/043 429/53 |
| 2012/0258339 A1* | 10/2012 | Kim | H01M 2/065 429/61 |
| 2012/0258340 A1* | 10/2012 | Park | H01M 10/44 429/61 |
| 2013/0122358 A1* | 5/2013 | Maeda | H01M 2/0413 429/185 |

* cited by examiner

SECONDARY BATTERY

CROSS-REFERENCE TO RELATED APPLICATION

Korean Patent Application No. 10-2014-0007340, filed on Jan. 21, 2014, in the Korean Intellectual Property Office, and entitled: "Secondary Battery," is incorporated by reference herein in its entirety.

BACKGROUND

1. Field

Embodiments relate to a secondary battery.

2. Description of the Related Art

Generally, secondary batteries can be discharged and recharged, unlike primary batteries, which are not rechargeable. Secondary batteries may be of a low capacity type, which includes battery cells in the form of a pack typically used for small portable electronic devices such as cellular phones and camcorders, or a high capacity type, which includes battery cells used as a motor-driving power source and having several battery cells connected to one another and widely used as a power source for hybrid vehicles, etc.

Secondary batteries may be manufactured in various shapes, such as cylindrical shape or prismatic shapes. A typical secondary battery may include an electrode assembly having a positive plate and a negative plate with a separator acting as an insulator between the positive and negative plates accommodated in a battery case with an electrolyte, and a cap assembly having electrode terminals coupled to the case.

SUMMARY

Embodiments are directed to a secondary battery including an electrode assembly, a case accommodating the electrode assembly, a cap plate sealing the case, the cap plate including an inversion plate, and a terminal assembly. The terminal assembly includes an insulation plate coupled to a top surface of the cap plate and having a short-circuit hole corresponding to the inversion plate and an air hole spaced apart from the short-circuit hole, a terminal plate coupled to a top surface of the insulation plate and electrically connected to the electrode assembly, and a sealing member coupled to a bottom surface of the insulation plate and opening or closing the air hole.

The sealing member may include a sealing ring surrounding the rim of the short-circuit hole, a rib extending from one side of the sealing ring to surround the rim of the air hole, and an air hole cover covering the air hole.

The inversion plate may include a round part convexly extending toward the electrode assembly, and an edge part fixed to the cap plate.

The round part of the inversion plate may be deformable to be brought into contact with the terminal plate when the internal pressure of the case exceeds a preset pressure.

When the round part of the inversion plate is deformed to be brought into contact with the terminal plate, air in a space between the round part of the inversion plate and the terminal plate may be exhaustible through the air hole.

When the air in the space between the round part of the inversion plate and the terminal plate is exhausted through the air hole, the air hole cover may open the air hole.

The air hole cover may have a smaller thickness than the rib.

The sealing member may include a thermoplastic elastomer.

The cap plate may include at least one coupling groove on its top surface. The insulation plate may include at least one coupling protrusion on a region of its bottom surface corresponding to the at least one coupling groove.

The insulation plate may include at least one coupling hole on its inner surface. The first terminal plate may include at least one coupling groove on a region of its outer surface corresponding to the at least one coupling hole.

The secondary battery may further include a fastening shaft electrically connected to the electrode assembly through a collector plate, the fastening shaft being shaft electrically connected to the terminal plate.

The fastening shaft may be riveted to a top surface of a terminal hole of the terminal plate.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
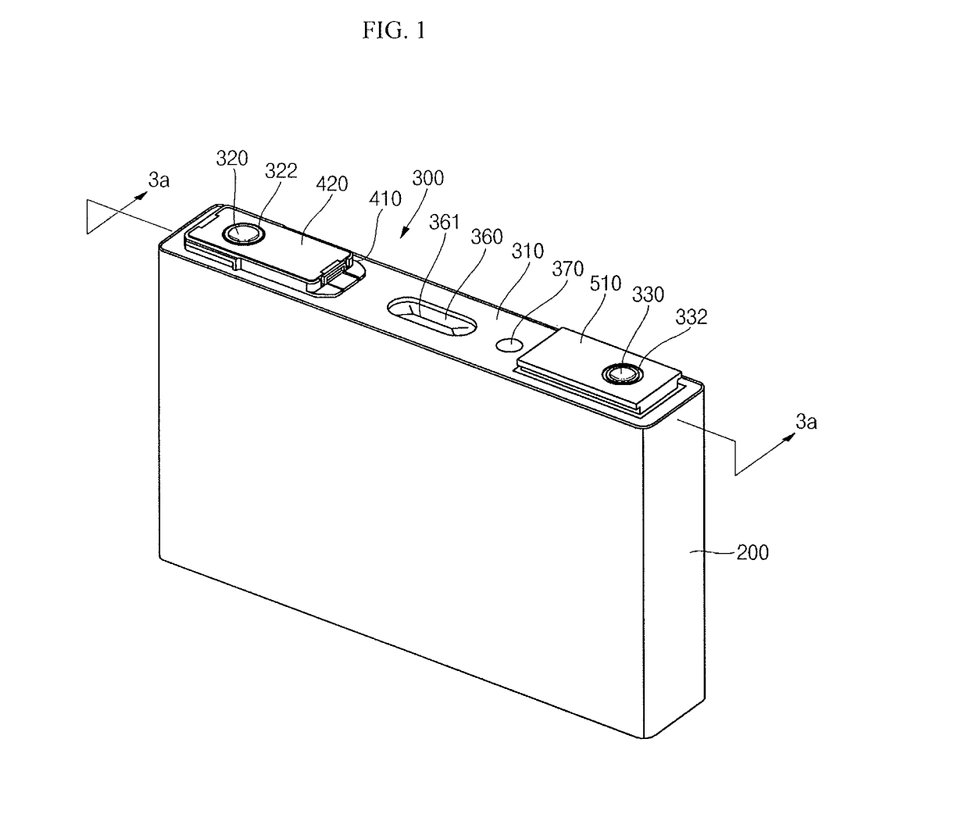
FIG. 1 illustrates a perspective view of a secondary battery according to an embodiment.
Figure 2:
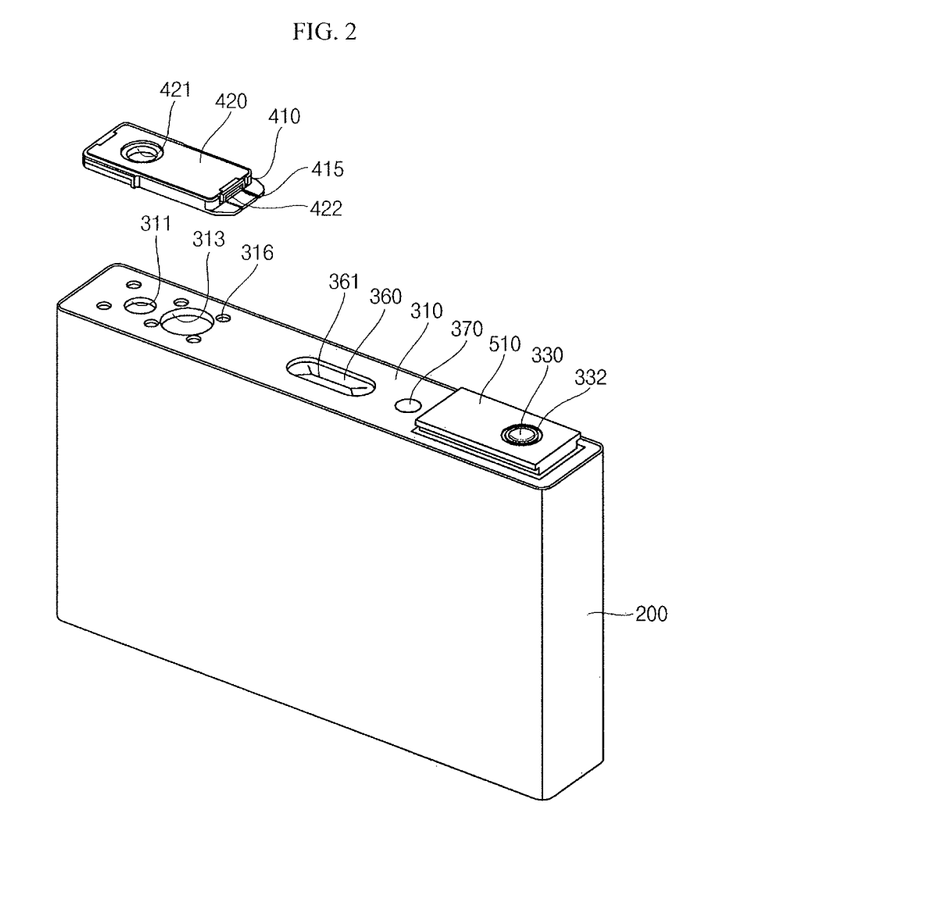
FIG. 2 illustrates an exploded perspective view illustrating a case and a first terminal assembly of the secondary battery shown in FIG. 1.
Figure 3A:
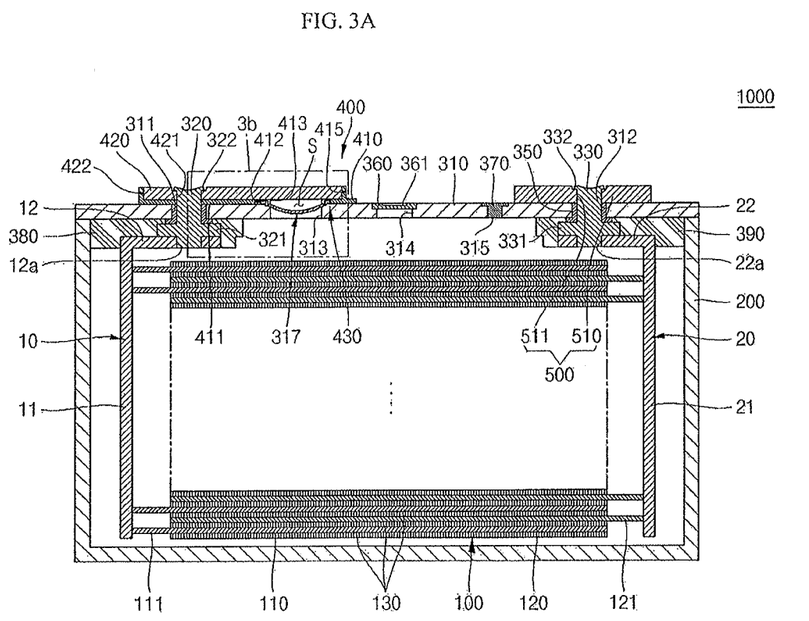
FIG. 3A illustrates a cross-sectional view taken along the line 3a-3a of FIG. 1.
Figure 3B:
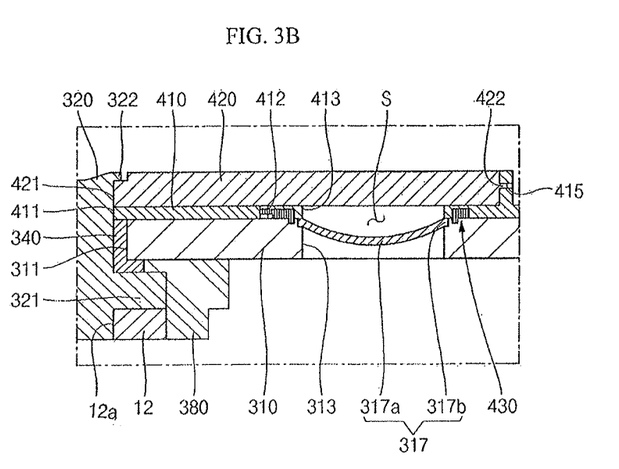
FIG. 3B is an enlarged cross-sectional view of a portion 3b of FIG. 3A.

FIG. 1 illustrates a perspective view of a secondary battery according to an embodiment, FIG. 2 illustrates an exploded perspective view depicting a case and a first terminal assembly of the secondary battery shown in FIG. 1, and FIG. 3A illustrates a cross-sectional view taken along the line 3a-3a of FIG. 1, and FIG. 3B illustrates an enlarged cross-sectional view of a portion 3b of FIG. 3A.

Referring to FIGS. 1 to 3B, the secondary battery 1000 according to an embodiment includes an electrode assembly 100, a case 200, a cap assembly 300, a first terminal assembly 400, and a second terminal assembly 500.

The electrode assembly 100 may include a wound or laminated stacked structure having a first electrode plate 110, a separator 130, and a second electrode plate 120. The electrode assembly 100 may have a thin plate or a thin foil shape. The first electrode plate 110 may function as a negative electrode, and the second electrode plate 120 may function as a positive electrode.

The first electrode plate 110 may be formed by coating a first electrode active material, such as graphite or carbon, on a first electrode collector formed of a metal foil made of, for example, nickel or copper. In addition, the first electrode plate 110 may include a first electrode uncoated portion 111 where the first electrode active material is not applied. The first electrode uncoated portion 111 may function as a passage for current flowing between the first electrode plate 110 and an exterior of the first electrode plate 110.

The second electrode plate 120 may be formed by coating a second electrode active material, such as a transition metal, on a second electrode collector formed of a metal foil made of, for example, aluminum. In addition, the second electrode plate 120 may include a second electrode uncoated portion 121 where the second electrode active material is not applied.

The second electrode uncoated portion 121 may function as a passage for current flowing between the second electrode plate 120 and an exterior of the second electrode plate 120.

The first electrode plate 110 and the second electrode plate 120 may be arranged to have different polarities.

The separator 130 may be positioned between the first electrode plate 110 and the second electrode plate 120 to prevent electrical short circuits and to allow movement of lithium ions. The separator may be made of a material selected from the group of polyethylene, polypropylene, or a copolymer of polypropylene and polyethylene, as examples.

A first collector plate 10 and a second collector plate 20 may be coupled to both ends of the electrode assembly 100 to be electrically connected to the first electrode plate 110 and the second electrode plate 120.

The first collector plate 10 may be made of a conductive material, such as nickel and may contact the first electrode uncoated portion 111 protruding to one end of the electrode assembly 100 to then be electrically connected to the first electrode plate 110. The first collector plate 10 may include a first connection part 11, a first extension part 12 and a first fastening hole 12a.

The first extension part 12 may be bent at an end of the first connection part 11 and may extend therefrom. The first extension part may be shaped like a plate substantially contacting the first electrode uncoated portion 111.

The first fastening hole 12a may be formed at one side of the first extension part 12 and may provide a space in the first extension part 12 to allow a first fastening shaft 320 of the cap assembly 300 to be fitted and coupled thereto.

The second collector plate 20 may be made of a conductive material, such as aluminum, and may contact a second electrode uncoated portion 121 protruding to the other end of the electrode assembly 100 to then be electrically connected to the second electrode plate 120. The second collector plate 20 may include a second connection part 21, a second extension part 22, and a second fastening hole 22a.

The second connection part 21, the second extension part 22, and the second fastening hole 22a of the second collector plate 20 may have substantially the same shape and function as the first connection part 11, the first extension part 12 and the first fastening hole 12a of the first collector plate 10. Accordingly explanations thereof will not be repeated.

The case 200 may be made of a conductive metal, such as aluminum, an aluminum alloy, or nickel-plated steel. The case 200 may have an approximately hexahedral shape with an opening such that the electrode assembly 100, the first collector plate 10, and the second collector plate 20 may be inserted and placed in the case 200. In FIG. 1, the case 200 and the cap assembly 300 assembled to each other are illustrated. Thus, the opening, which is a substantially opened part of the peripheral edge of the cap assembly 300, is not illustrated in FIG. 1. The inner surface of the case 200 may be subjected to an insulation treatment, such that the case 200 may be insulated from the electrode assembly 100, the first collector plate 10, the second collector plate 20, and the cap assembly 300. The case 200 may have a polarity. For example, the case 200 may function as a positive electrode.

The cap assembly 300 may be coupled to the case 200. The cap assembly 300 may include a cap plate 310, a first fastening shaft 320, a second fastening shaft 330, a first gasket 340, and a second gasket 350. The cap assembly 300 may further include a vent plate 360, a plug 370, a first insulation member 380, and a second insulation member 390.

The cap plate 310 may seal the opening of the case 200 and may be made of the same material as the case 200. The cap plate 310 may include a first fastening hole 311, a second fastening hole 312, a first short-circuit hole 313, a vent hole 314, an electrolyte injection hole 315, a coupling groove 316, and an inversion plate 317. The cap plate 310 may have the same polarity as the case 200.

The coupling groove 316 may be formed on a top surface of the cap plate 310 and may engage a first terminal assembly 400 to be described below.

The inversion plate 317 may be formed in the first short-circuit hole 313 of the cap plate 310. Referring to FIG. 3A, the inversion plate 317 is illustrated as being formed in the first short-circuit hole 313 of the cap plate. As illustrated in FIG. 3B, the inversion plate 317 may also be formed in the second short-circuit hole 413 of the insulation plate 410.

The inversion plate 317 may have a downwardly convex round part 317a and an edge part 317b fixed to the second short-circuit hole 413 of the insulation plate 410. Here, the inversion plate 317 may be electrically connected to the cap plate 310 and may have the same polarity as the cap plate 310.

When the internal pressure of the secondary battery 1000 exceeds a preset pressure due to overcharge occurring in the secondary battery 1000, the round part 317a of the inversion plate 317 may be inverted to upwardly, convexly protrude to make contact with the first terminal plate 420, causing a short-circuit.

A predetermined volume of air may exist in a space S between the round part 317a and the first terminal plate 420. If the air were allowed to remain between the round part 317a and the first terminal plate 420 when the round part 317a is rapidly upwardly inverted, the air in the space S could prevent the inversion plate from contacting the first terminal plate 420. According to embodiments, when the round part 317a is rapidly upwardly inverted, the air may be exhausted to a region between the cap plate 310 and the insulation plate 410 through an air hole 412 to be described below. Exhausting the air existing in the space S may allow the insulation plate 410 and the first terminal plate 420 to contact each other.

The first fastening shaft 320 may pass through the first fastening hole 311 of the cap plate 310 to be electrically connected to the first collector plate 10. The first fastening shaft 320 may be pillar-shaped. A riveting part 322 to be described below may be formed on the outer circumferential edge of an upper portion of the pillar shape of the first fastening shaft 320 exposed to an upper portion of the cap plate 310. A flange 331 preventing the first fastening shaft 320 from being dislodged from the cap plate 310 may be formed on a lower portion of the pillar shape of the first fastening shaft 320 positioned at a lower portion of the cap plate 310. A portion of a pillar of the first fastening shaft 320 positioned at a lower portion of a flange 321 may be inserted into the first fastening hole 12a of the first collector plate 10.

The second fastening shaft 330 may pass through the second fastening hole 312 of the cap plate 310 to be electrically connected to the second collector plate 20. The second fastening shaft 330 may have a flange 331 and a riveting part 332, which may have a same configuration as the first fastening shaft 320. An explanation thereof will not be repeated. The second fastening shaft 330 may be electrically connected to the cap plate 310.

The first and second gaskets 340 and 350 may be formed between each of the first fastening shaft 320 and the second fastening shaft 330 and the cap plate 310 using an insulating material to seal spaces between each of the first fastening shaft 320 and the second fastening shaft 330 and the cap plate 310. The first and second gaskets 340 and 350 may prevent external dew condensation from penetrating into the secondary battery 1000 or may prevent an electrolyte accommodated in the secondary battery 1000 from flowing out.

The vent plate 360 may be installed in the vent hole 314 of the cap plate 310 and may include a notch 361 formed to be openable at a preset pressure. The plug 370 may seal the electrolyte injection hole 315 of the cap plate 310.

The first insulation member 380 and the second insulation member 390 may be formed between each of the first collector plate 10 and the second collector plate 20 and the cap plate 310 to prevent undesired short-circuits from occurring.

The first terminal assembly 400 may include an insulation plate 410, a first terminal plate 420, and a sealing member 430.

The insulation plate 410 may include a first fastening hole 411, an air hole 412, a second short-circuit hole 413, a first coupling protrusion 414, and a coupling hole 415. The insulation plate 410 may be coupled to the top surface of the cap plate 310.

The first fastening hole 411 may be a hole through which the first fastening shaft 320 passes. The second short-circuit hole 413 may be formed at one side of the cap plate 310 so as to be located and sized to correspond to the first short-circuit hole 313.

The air hole 412 may be formed to be spaced a predetermined distance apart from the second short-circuit hole 413. When the round part 317a is rapidly upwardly inverted, the air existing in the space S between the round part 317a and the first terminal plate 420 may be exhausted to a region between the cap plate 310 and the insulation plate 410 through the air hole 412. Exhausting the air existing in the space S may prevent the insulation plate 410 and the first terminal plate 420 from being kept apart from each other.

The first coupling protrusion 414 may be inserted into the coupling groove 316 formed on the top surface of the cap plate 310, thereby tightly coupling the first terminal assembly 400 to the cap assembly 300.

The coupling hole 415 may be formed on a lateral surface of the insulation plate 410, and a second coupling protrusion 422 of the first terminal plate 420 to be described below may be inserted into the coupling hole 415, thereby tightly coupling the insulation plate 410 and the first terminal plate 420 to each other.

The first terminal plate 420 may be coupled to a top surface of the insulation plate 410 and may include a first fastening hole 421 and the second coupling protrusion 422.

The first fastening hole 421 may be a hole through which the first fastening shaft 320 passes. A top end of the first fastening shaft 320 may be riveted to a top portion of the first fastening hole 421, forming the riveting part 322.

Figure 4A:
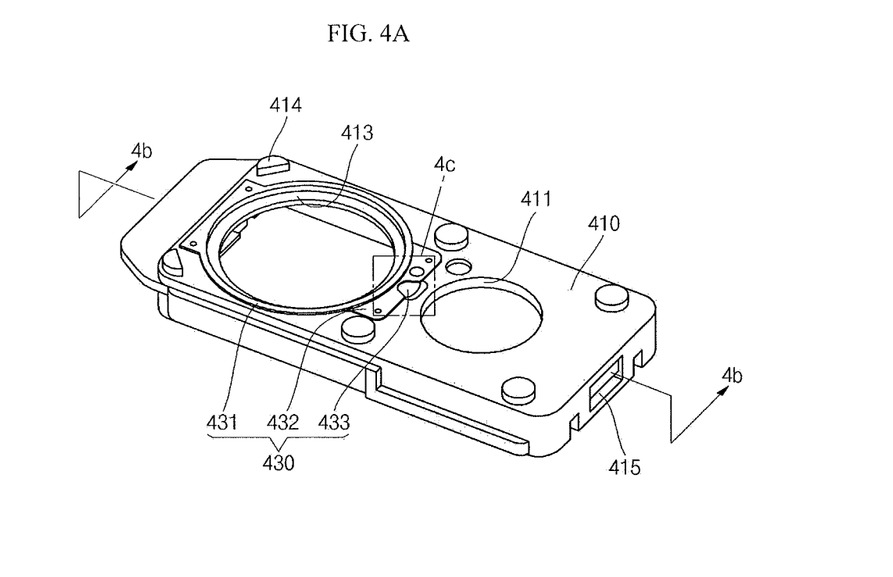
FIG. 4A illustrates a perspective view depicting an insulation plate and a sealing member of the secondary battery shown in FIG. 1.
Figure 4B:
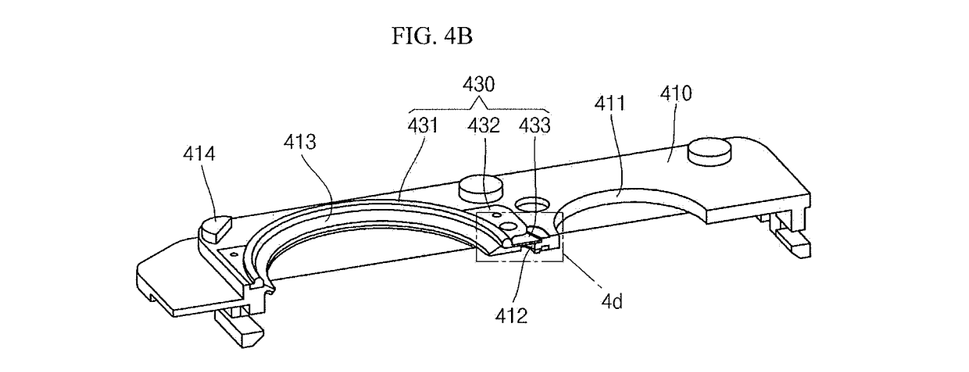
FIG. 4B illustrates a cut-away perspective view taken along the line 4b-4b of FIG. 4A.
Figure 4C:
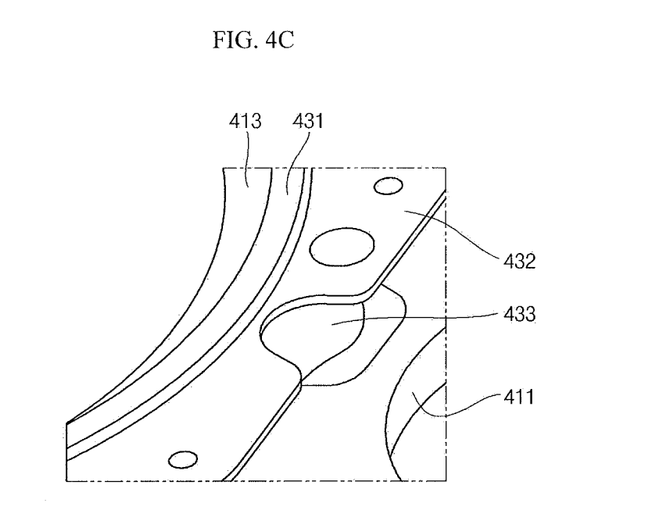
FIG. 4C illustrates an enlarged view of a portion 4c of FIG. 4A.
Figure 4D:
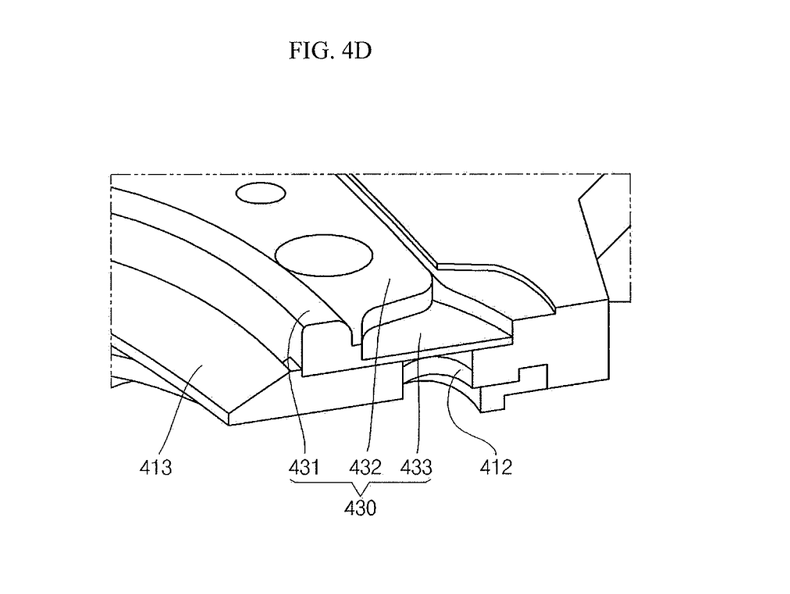
FIG. 4D illustrates an enlarged view of a portion 4d of FIG. 4B.

FIG. 4A illustrates a perspective view depicting an insulation plate and a sealing member of the secondary battery shown in FIG. 1, FIG. 4B is a cut-away perspective view taken along the line 4b-4b of FIG. 4A, FIG. 4C is an enlarged view of a portion 4c of FIG. 4A, and FIG. 4D is an enlarged view of a portion 4d of FIG. 4B.

The sealing member 430 will now be described with reference to FIGS. 4A to 4D.

The sealing member 430 may be formed between the cap plate 310 and the insulation plate 410 and may include a sealing ring 431, a rib 432, and an air hole cover 433.

The sealing ring 431 may be formed to surround the rim of the second short-circuit hole 413 of the insulation plate 410. The sealing ring 431 may seal a space between the insulation plate 410 and the cap plate 310, thereby preventing external dew condensation from penetrating through the space between the insulation plate 410 and the cap plate 310 and gathering on the inversion plate 317. The sealing ring 431 may prevent the first terminal plate 420 and the inversion plate 317 from being electrically connected and short-circuited due to the dew condensation, thereby reducing deterioration of the secondary battery 1000 and suppressing a reduction in the capacity of the secondary battery 1000. For example, the short-circuit occurring when the first terminal plate 420 and the inversion plate 317 are electrically connected to each other due to dew condensation may be a minute short-circuit in which a small amount of current flows. In addition, it may also be possible to prevent internal components of the secondary battery 1000 from corroding due to the dew condensation. The sealing ring 431 may increase sealing efficiency. The sealing ring 431 may be made of an adhesive having an insulating property or a rubber. For example, the sealing ring 431 may be made of a thermoplastic elastomer (TPE) having excellent formability and corrosion resistance and having elasticity.

The rib 432 may extend from one side of the sealing ring 431 and may be formed to surround the rim of the air hole 412.

The air hole cover 433 may extend from the rib 432 and may be formed to cover the air hole 412. The air hole cover 433 may be formed of a film that is thinner than the rib 432 such that the air hole cover 433 may be deformed by the flow of air, as will be described below.

The air hole cover 433 may seal one side of the air hole 412, thereby preventing externally penetrating dew condensation from being induced through the air hole 412 and preventing internal components of the secondary battery 1000 from corroding due to dew condensation.

Figure 5A:
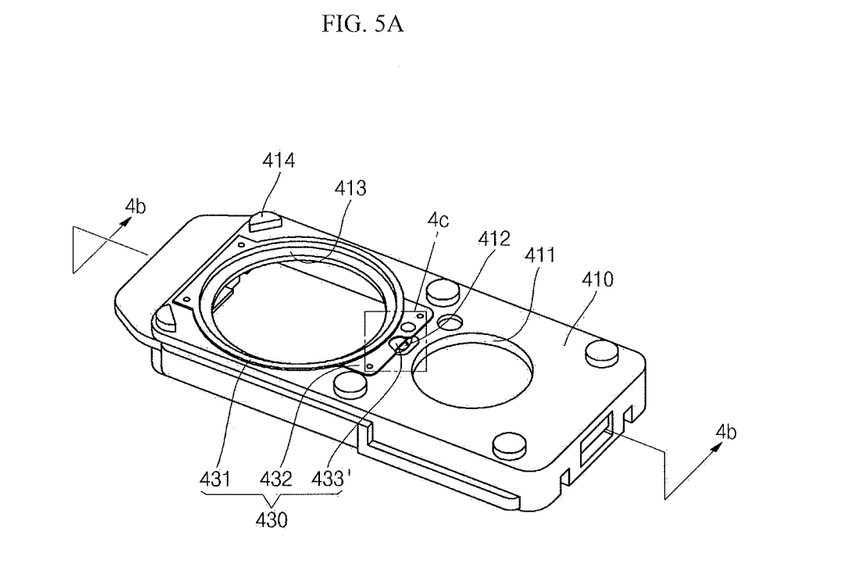
FIG. 5A illustrates a perspective view depicting an insulation plate and a sealing member when an air hole is opened in the secondary battery shown in FIG. 1.
Figure 5B:
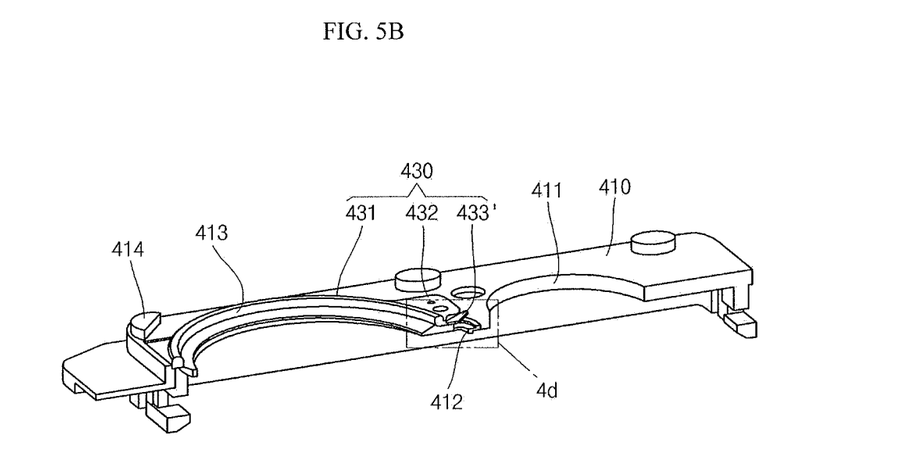
FIG. 5B illustrates a cut-away perspective view taken along the line 5b-5b of FIG. 5A.
Figure 5C:
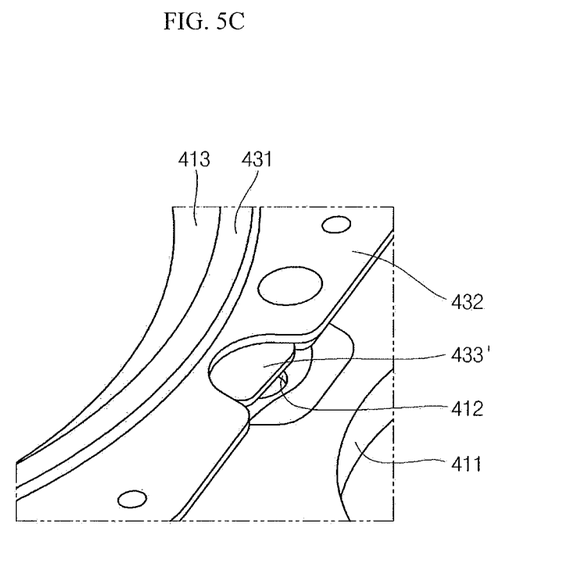
FIG. 5C illustrates an enlarged view of a portion 5c of FIG. 5A.
Figure 5D:
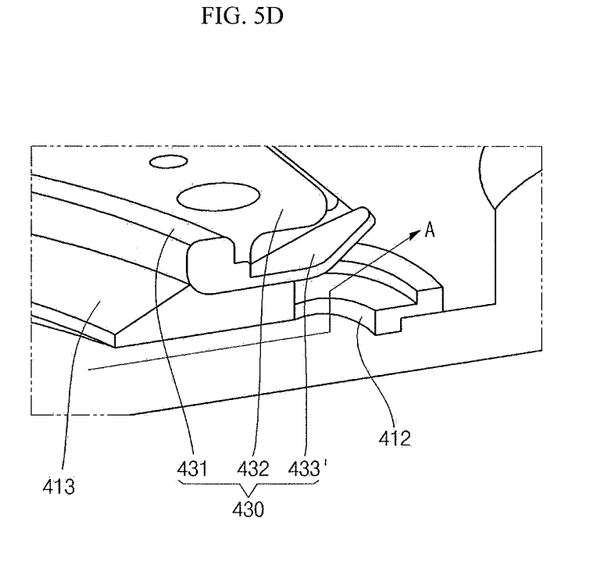
FIG. 5D illustrates an enlarged view of a portion 5d of FIG. 5B.

FIG. 5A is a perspective view illustrating an insulation plate and a sealing member when an air hole is opened in the secondary battery shown in FIG. 1, FIG. 5B is a cut-away perspective view taken along the line 5b-5b of FIG. 5A, FIG. 5C is an enlarged view of a portion 5c of FIG. 5A, and FIG. 5D is an enlarged view of a portion 5d of FIG. 5B.

The opening mechanism of the air hole 112 in the secondary battery 1000 according to an embodiment will be described with reference to FIGS. 5A to 5D.

As described above with reference to FIG. 3B, a predetermined volume of air may exist in the space S between the round part 317a and the first terminal plate 420.

When the internal pressure exceeds a preset pressure due to an overcharge occurring to the secondary battery 1000, the round part 317a of the inversion plate 317 may be rapidly upwardly inverted, and the air in the space S may be exhausted through the air hole 412 due to deformation of the round part 317a.

While the air in the space S is exhausted through the air hole 412, an air flow A may occur, and the air hole cover 433 may be deformed away from the electrode assembly 100 by the air flow A, forming an opened air hole cover 433' opening the air hole 412.

Referring again to FIGS. 1 to 3A, the second terminal assembly 500 may include a second terminal plate 510 and a second fastening hole 511 passing through the second terminal plate 510.

The second terminal plate 510 is coupled to the top surface of the cap plate 310. Preferably, the second terminal plate 510 may be physically coupled to the top surface of the cap plate 310 by welding. In other implementations, the second terminal plate 510 may be coupled to the cap plate 310 using a coupling protrusion and a coupling groove formed between the second terminal plate 510 and the cap plate. The second terminal plate 510 may be electrically connected to the cap plate 310 and may have the same polarity with the cap plate 310.

The second fastening hole 511 may be a hole through which the second fastening shaft 330 passes. A top end of the second fastening shaft 330 may be riveted to a top portion of the second fastening hole 511, forming the riveting part 332.

By way of summation and review, general secondary batteries may undergo accelerated deterioration by short-circuiting due to dew condensation induced into the secondary batteries, In such a case, general secondary batteries may have a reduced capacity, resulting in corrosion of internal components due to dew condensation.

Embodiments provide a secondary battery in which deterioration and reduction in capacity caused by short-circuiting due to infiltration of dew condensation may be prevented.

Aspects further provide a secondary battery in which corrosion of internal components of a secondary battery due to infiltration of dew condensation may be prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A secondary battery, comprising:
   an electrode assembly;
   a case accommodating the electrode assembly;
   a cap plate sealing the case, the cap plate including an inversion plate, the inversion plate including a round part convexly extending toward the electrode assembly, and an edge part fixed to the cap plate; and
   a terminal assembly, the terminal assembly including:
      an insulation plate coupled to a top surface of the cap plate and having a short-circuit hole corresponding to the inversion plate,
      a terminal plate coupled to a top surface of the insulation plate and electrically connected to the electrode assembly, the round part of the inversion plate included in the cap plate being deformable to be brought into contact with the terminal plate when an internal pressure of the case exceeds a preset pressure, and
      a sealing member coupled to a bottom surface of the insulation plate, the sealing member including a sealing ring that surrounds a rim of the short-circuit hole, a rib extending from one side of the sealing ring in a direction away from the short-circuit hole, and an air hole cover extending from the rib,
   wherein:
      the insulation plate includes an air hole that is offset from the short-circuit hole at a location corresponding to the air hole cover of the sealing member, the air hole cover being deformable to open the air hole to exhaust air from a space between the inversion plate and the terminal plate when the round part of the inversion plate is deformed.

2. The secondary battery as claimed in claim 1, wherein the rib surrounds a rim of the air hole.

3. The secondary battery as claimed in claim 2, wherein the air hole cover has a smaller thickness than the rib.

4. The secondary battery as claimed in claim 1, wherein the sealing member includes a thermoplastic elastomer.

5. The secondary battery as claimed in claim 1, wherein:
   the cap plate includes at least one coupling groove on its top surface, and
   the insulation plate includes at least one coupling protrusion on a region of its bottom surface corresponding to the at least one coupling groove.

6. The secondary battery as claimed in claim 1, wherein:
   the insulation plate includes at least one coupling hole on its inner surface, and
   the terminal plate includes at least one coupling groove on a region of its outer surface corresponding to the at least one coupling hole.

7. The secondary battery as claimed in claim 1, further comprising a fastening shaft electrically connected to the electrode assembly through a collector plate, the fastening shaft being electrically connected to the terminal plate.

8. The secondary battery as claimed in claim 7, wherein the fastening shaft is riveted to a top surface of a terminal hole of the terminal plate.

* * * * *